United States Patent
Chao et al.

(10) Patent No.: US 7,447,364 B2
(45) Date of Patent: *Nov. 4, 2008

(54) VIDEO IMAGE CAPTURING AND DISPLAYING METHOD AND SYSTEM APPLYING SAME

(75) Inventors: Tzu-Yi Chao, Hsin-Chu (TW); Chih-Hung Lu, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 889 days.

This patent is subject to a terminal disclaimer.

(21) Appl. No.: 10/711,195

(22) Filed: Aug. 31, 2004

(65) Prior Publication Data

US 2006/0045367 A1    Mar. 2, 2006

(51) Int. Cl.
*G06K 9/36* (2006.01)
*G06K 9/46* (2006.01)

(52) U.S. Cl. .................... 382/232; 382/239

(58) Field of Classification Search ............... 382/232, 382/233, 239, 240, 250; 348/207.1
See application file for complete search history.

(56) References Cited

U.S. PATENT DOCUMENTS 4,598,411 A * 7/1986 Berkovich et al. .......... 375/246

* cited by examiner

*Primary Examiner*—Phuoc Tran
(74) *Attorney, Agent, or Firm*—Winston Hsu

(57) ABSTRACT

A video image capturing and displaying method includes capturing a video image having a time series of image frames; compressing the video image with each sequential line of the image frame as the basic compression unit; decompressing the compressed video image in the buffer; and displaying the decompressed video image.

7 Claims, 4 Drawing Sheets

VIDEO IMAGE CAPTURING AND DISPLAYING METHOD AND SYSTEM APPLYING SAME

BACKGROUND OF INVENTION

1. Field of the Invention

The present invention relates to a video image capturing and displaying method, and more particularly, to a video image capturing and displaying method used for a web camera.

2. Description of the Prior Art

Image information is an important form of media in modern society since we need to transmit images from one place to another, such as by downloading pictures or movies from the Internet, synchronous communication in net meetings, transmitting image data in a wireless manner, etc. Because image data typically has a large amount of bytes, transmission of image data is slow and inefficient. Therefore, video compression techniques are used before sending image data to improve the transmission efficiency.

Web cameras, a popular peripheral device for a computer, are used to record a series of dynamic images. The recorded video is compressed and passed to one computer by a transmission interface. Please refer to FIG. 1. FIG. 1 illustrates a well-known computer 10 equipped with a web camera. The computer 10 comprises a web camera 12, a USB transmission interface 14, and a terminator 16. The web camera 12 can take a plurality of pictures in a period, the pictures being transformed into video signals. The web camera 12 further comprises a compression circuit, which compresses the video signals. The video signals are sent to the terminator 16 by the USB transmission interface 14 that connects the web camera 12 and the terminator 16. The terminator 16, functioning as a well-known computer, communicates with the Internet.

A USB transmission interface has different transmission specifications with which to comply. Different specifications prescribe different transmission speeds. Here, we discuss the case of 1 M Bytes/sec transmission speed. When the web camera 12 captures dynamic pictures, the frame rate should be 30 frames per second so that people can see these discrete frames displayed in a period as a continuous video. Generally speaking, one frame taken by the web camera 12 has about 100 K pixels, wherein the horizontal resolution is 352 pixels and the vertical resolution is 288 pixels. Therefore, according to the frame rate of the web camera 12 and pixel numbers of each frame, the web camera 12 receives 30*100 K Bytes =3 M Bytes within one second. However, as the mentioned above, the USB transmission interface 14 merely provides transmission rate of 1 M Bytes/sec. So, the captured images should be compressed into one third or less so that they can be transmitted by the USB transmission interface 14.

Video compression is needed to make image transmission possible under limited speed of a transmission interface. There are two kinds of compression methods in the prior art: frame-based compression and block-based compression. Frame-based compression uses one frame as the basic image compression unit. In other words, all pixels in one frame are compressed under one compression mode in the frame-based compression. This method uses less hardware, is less complicated, and is more cost effective. However, each group of pixels in one frame has different complexity and if a group of pixels with high complexity is compressed with a low compression ratio, this still leads to too large data for transmission even after compression. In contrast, if the group of pixels belonging to a simple drawing is compressed with a high compression ratio, the image has serious distortion.

Block-based compression, taking one block of a frame as the basic image compression unit, compresses complicated image blocks with a higher compression ratio so that the volume of the compressed data is small enough, and compresses simple image blocks with a lower compression ratio so that the compressed data is more like the original image. Although block-based compression solves the problems of frame-based compression, it divides one frame into blocks and each block unit will be given one compression mode. Because the sensor input order is the line-based order, we need additional memory to store these blocks. Therefore, division of one frame increases system hardware and cost.

SUMMARY OF INVENTION

It is therefore an objective of the claimed invention to provide an image compression method in order to solve the above-mentioned problems.

According to the claimed invention, a video image capturing and displaying method for a web camera comprises the steps of capturing a video image consisting of a time series of image frames; compressing the video image with each sequential line of the image frame as the basic compression unit; decompressing the compressed video image in the buffer; and displaying the decompressed video image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
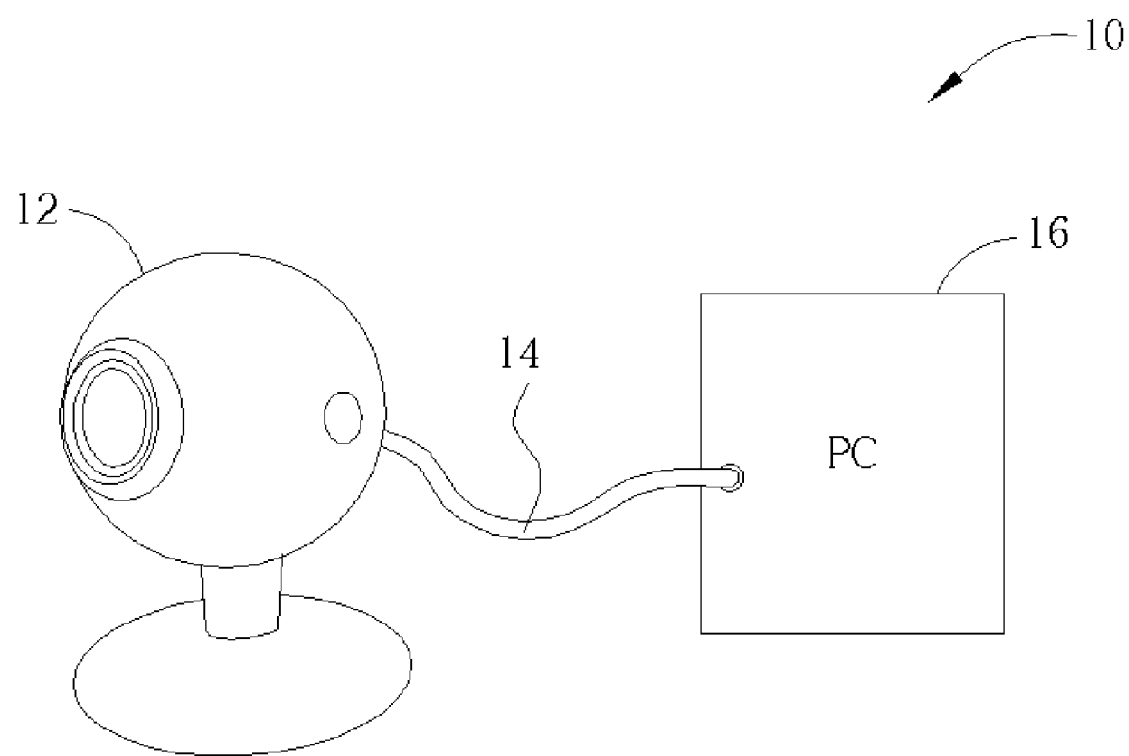
FIG. 1 illustrates a well-known computer equipped with a web camera.
Figure 2:
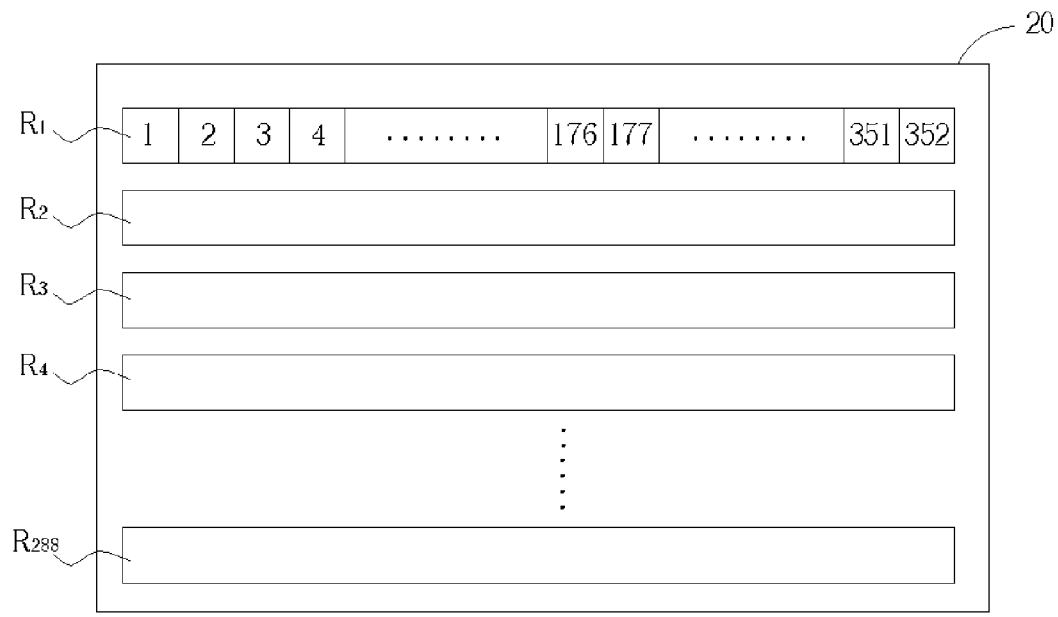
FIG. 2 illustrates a basic image compression unit which is continuous N pixels in one frame according to the present invention.

Please refer to FIG. 2. FIG. 2 illustrates a basic image compression unit of continuous N pixels in one frame 20. The frame 20 comprises around 100 K pixels, 352 horizontal pixels by 288 vertical pixels. R1 represents the 1st row of pixels, R2 represents the 2nd row of pixels, R288 represents the 288th row of pixels and so on in FIG. 2. Each row of pixels consists of 352 pixels, as labeled from 1 to 352. The basic image compression unit of the present invention is continuous N pixels. For example, the 1st to the 176th pixels belong to one unit, and the next unit is the 177th to the 352nd pixels. The preferred embodiment of the present invention takes one line of a frame as the basic image compression unit. That is, all pixels in the row R1 undergo the same compression mode. All pixels in the row R2 undergo the same compression mode. Compression modes of the row R1 and the row R2 can be different.

Of course, the number of total pixels in one frame is different according to different frame resolutions or specifications. The number of rows and horizontal pixels need not be the same. FIG. 2 is shown as an example instead of a general case.

Figure 3:
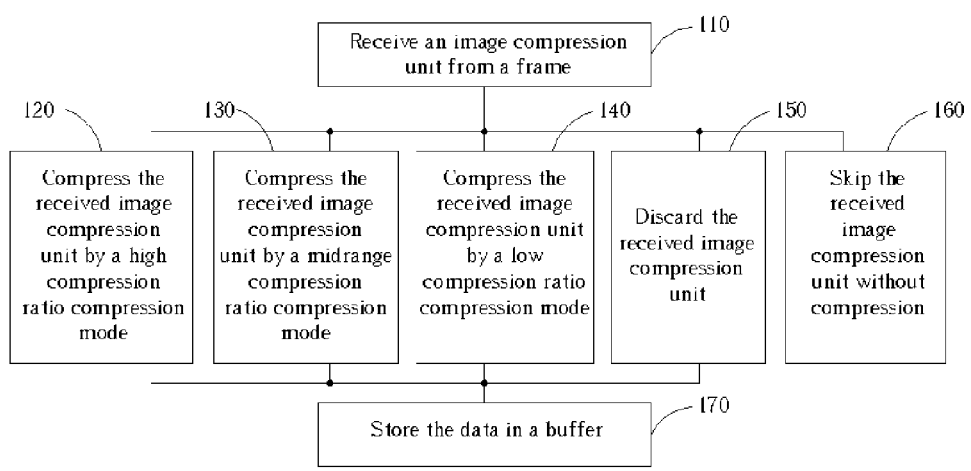
FIG. 3 illustrates one embodiment of a video image capturing and displaying method according to the present invention.

Please refer to FIG. 3. FIG. 3 illustrates one embodiment of a video image capturing and displaying method according to the present invention. In the step 110, an image compression unit from a frame, which is shot by a web camera or other capture device, is received. For example, if one line of a frame in FIG. 2 is one image compression unit, the image compression unit has 352 (N=352) pixels.

The step 120, step 130, step 140, step 150, and step 160 follow the step 110, meaning that any procedure from the step 120 to the step 160 can be executed after the step 110. A main characteristic of the present invention is to use one line of pixels (a plurality of continuous pixels) as the basic image compression unit, and different compression modes can be applied to different units. In the preferred embodiment, the step 120 uses a high compression ratio compression mode to compress images. In the step 130, a compression mode having a midrange compression ratio is used. In the step 140, a compression mode of low compression ratio is used. Therefore, one compression mode is selected for the image compression unit received in the step 110 so that the compressed data can efficiently utilize bandwidth of a USB transmission interface (or other transmission interface) without suffering serious image distortion. The compression methods used in the present invention include differential pulse coded modulation (DPCM), wavelet compression, discrete cosine translation (DCT), etc. Note that the three kinds of compression modes from the step 120 to the step 140 are recommended examples. More compression modes can be used.

In some special cases, the received images need not be processed. This can happen, for example, when a web camera shoots pictures in the environment of low brightness. The volume of one captured picture is small, and such small amount of image data can be directly transmitted by the USB transmission interface. Therefore, in the step 160, the image compression unit does not undergo compression in order to obtain better image quality.

In the step 170, data processed by the step 120, the step 130, the step 140, and the step 160 is stored in a buffer. The buffer stores the compressed or processed data and the data will be sent to a computer for further processing (for example, to display the images). Usually such a buffer is not designed to have a large volume for cost considerations. Due to the small volume of the buffer, if the data inputted into the buffer is too much or arrives too fast, new data enters the buffer before old data is processed. The new data must be discarded, or video images on the screen of a display device will hang up. In the step 150, when the buffer capacity is found to be not enough to receive further data, the new-coming data is discarded. The data that has been discarded will not be processed in the step 170 and only line header is used in this mode.

Figure 4:
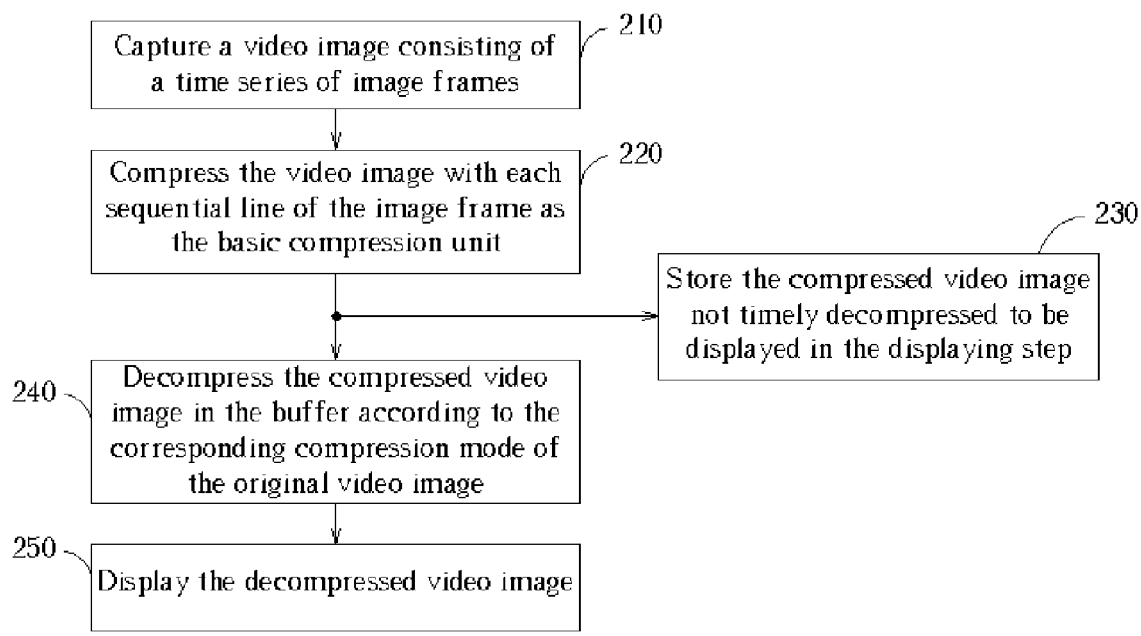
FIG. 4 illustrates another embodiment of a video image capturing and displaying method according to the present invention.

Please refer to FIG. 4. FIG. 4 illustrates another embodiment of a video image capturing and displaying method according to the present invention. In the step 210, capture a video image consisting of a time series of image frames. In the step 220, compress the video image with each sequential line of the image frame as the basic compression unit. Each sequential line undergoes a kind of compression mode according to the content of the sequential line. If the data of one line is complicated, then the line will be compressed in a higher compression rate. If the data of one line is not large, the line will be compressed in a low compression rate or even not be compressed. In the step 240, decompress the compressed video image in the buffer according to the corresponding compression mode of the original video image. In the step 250, display the decompressed video image. In the step 230, store the compressed video image not timely decompressed to be displayed in the displaying step.

Figure 5:
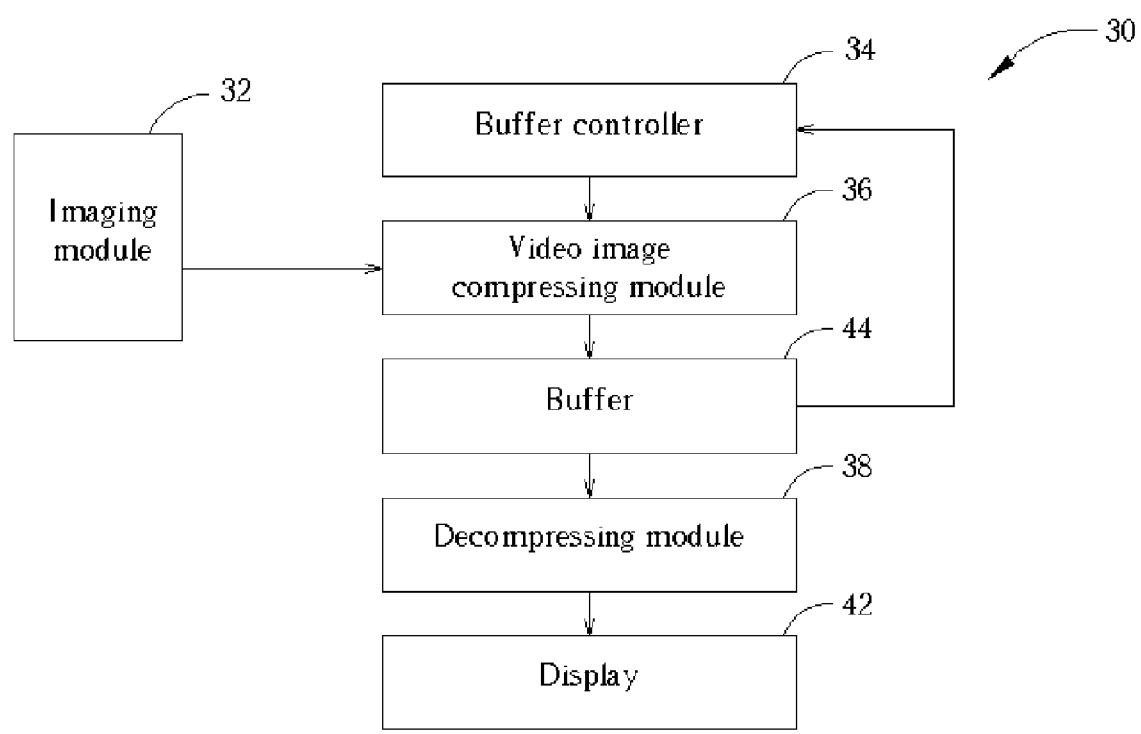
FIG. 5 illustrates a video image capturing and displaying system according to the present invention.

Please refer to FIG. 5. FIG. 5 illustrates a video image capturing and displaying system 30 of the present invention. The video image capturing and displaying system 30 comprises an imaging module 32, a buffer controller 34, a video image compressing module 36, a decompressing module 38, a display 42 and a buffer 44. The imaging module 32 is used for capturing a video image consisting of a time series of image frames. The video image compressing module 36 comprises a plurality of compressing engines, for compressing the video image. Different compressing engines compress each sequential line of the image frame as the basic compression unit with different compression methods or compression rates. The video image compressing module 36 can implement the step 120, the step 130, and the step 140 in FIG. 3. The buffer controller 34, connected to the video image compressing module 36 is used for selecting one of the plurality of compressing engines to compress the video image. The plurality of compressing engines compress the video image in different compression modes or different compression rates. In the preferred embodiment, the compression mode adopted in the compressing step is selected from one of a group consisting of differential pulse coded modulation, wavelet compression, and discrete cosine and translation. In the application of the web camera using the USB specification as the transmission interface, the compression ratio adopted in the compressing step ranges from 1/2 to 1/5. After the video image is compressed by the video image compressing module 36, the compressed image is stored in the buffer 44. The decompressing module 38 comprises a plurality of decompressing engines corresponding to the plurality of compressing engines, for decompressing the compressed video image stored in the buffer. The display 42 is used for displaying the decompressed video image.

The present invention utilizes a plurality of pixels in one row of a frame, or, more specifically, utilizes one line as a basic image compression unit. Each image compression unit undergoes one compression mode, but different image compression unit can have different compression modes, compression methods, or compression ratios. In this method, each image compression unit only needs one header for assigning numbers to define the identity of each pixel in one image compression unit rather than demands additional coding hardware in other compression methods. Therefore, the video image capturing and displaying method of the present invention improves the compression efficiency and reduces hardware. The video image capturing and displaying system of the present invention has the advantages of low cost and small size.

In the application of web cameras, when the USB transmission interface has not enough bandwidth, the image compression method of the present invention selects different compression modes for different image compression units according to the image complexity in order to maintain high frame rate or improve the image quality. The compression mode for each image compression unit includes differential pulse coded modulation of different quantization steps. The present invention further provides the function of discarding data to prevent data overflow in the buffer.

The first compression method of the prior art, the frame-based compression method, uses one frame as the basic image compression unit, however, each group of pixels in one frame has different complexity, leading to too large data for transmission or serious image distortion. The second compression method of the prior art, the block-based compression method, uses one block of a frame as the basic image compression unit, however, this method divides one frame into several blocks and each block has to be given one compression mode for image recovery, requiring additional memory to implement increasing system hardware and cost of production. Moreover, the methods of the prior art can result in an image hanging when the space of the buffer is not enough. Compared to the prior art, the present invention utilizes one line or a plurality of continuous pixels in one row of a frame as the basic image compression unit, having the advantages of being a simple implementing method, having small hardware size, low cost, good compression quality, efficient bandwidth use, and prevention of image hanging.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A video image capturing and displaying method for a web camera, comprising the steps of:
   capturing a video image consisting of a time series of image frame, each image frame comprising a plurality of sequential lines of pixels;
   compressing the video image with one of at least a first compressing mode and a second compressing mode for each basic compression unit, wherein the first compressing mode and the second compressing mode have compression ratios different from each other;
   storing the compressed video image in a buffer;
   decompressing the compressed video image stored in the buffer corresponding to the compressing mode; and
   displaying the video image based on the decompressed video image.

2. The video image capturing and displaying method of claim 1, wherein the compression ratios of the compressing modes range from 1/2 to 1/5.

3. The video image capturing and displaying method of claim 1, wherein the compression mode adopted in the compressing step is selected from the group consisting of differential pulse coded modulation, wavelet compression, and discrete cosine translation.

4. The video image capturing and displaying method of claim 1, wherein the basic compression unit is one sequential line of pixel.

5. The video image capturing and displaying method of claim 1, wherein the step of compressing the captured video image further comprising a mode of skipping a specific sequential line.

6. The video image capturing and displaying method of claim 1, wherein the step of compressing the captured video image further comprising a mode of processing a specific sequential line without compression.

7. A video image capturing and displaying system comprising:
   an imaging module for capturing a video image consisting of a time series of image frames, each image frame comprising a plurality of sequential lines of pixels;
   a video image compressing module comprising at least a first compressing engine and a second compressing engine, for compressing the captured video image, wherein the first compressed engine and the second compressing engine have compression ratios different from each other;
   a buffer controller for actuating one of at least the first compressing engine and the second compressing engine for compressing each sequential line as the basic compression unit;
   a buffer for storing the compressed video image;
   a decompressing module for decompressing the compressed video image stored in the buffer corresponding to the compressing engine; and
   a display for displaying the decompressed video image.

* * * * *